Feb. 10, 1925.
E. W. WESCOTT
1,525,480
MANUFACTURE OF ARSENIC ACID
Filed Nov. 9, 1920
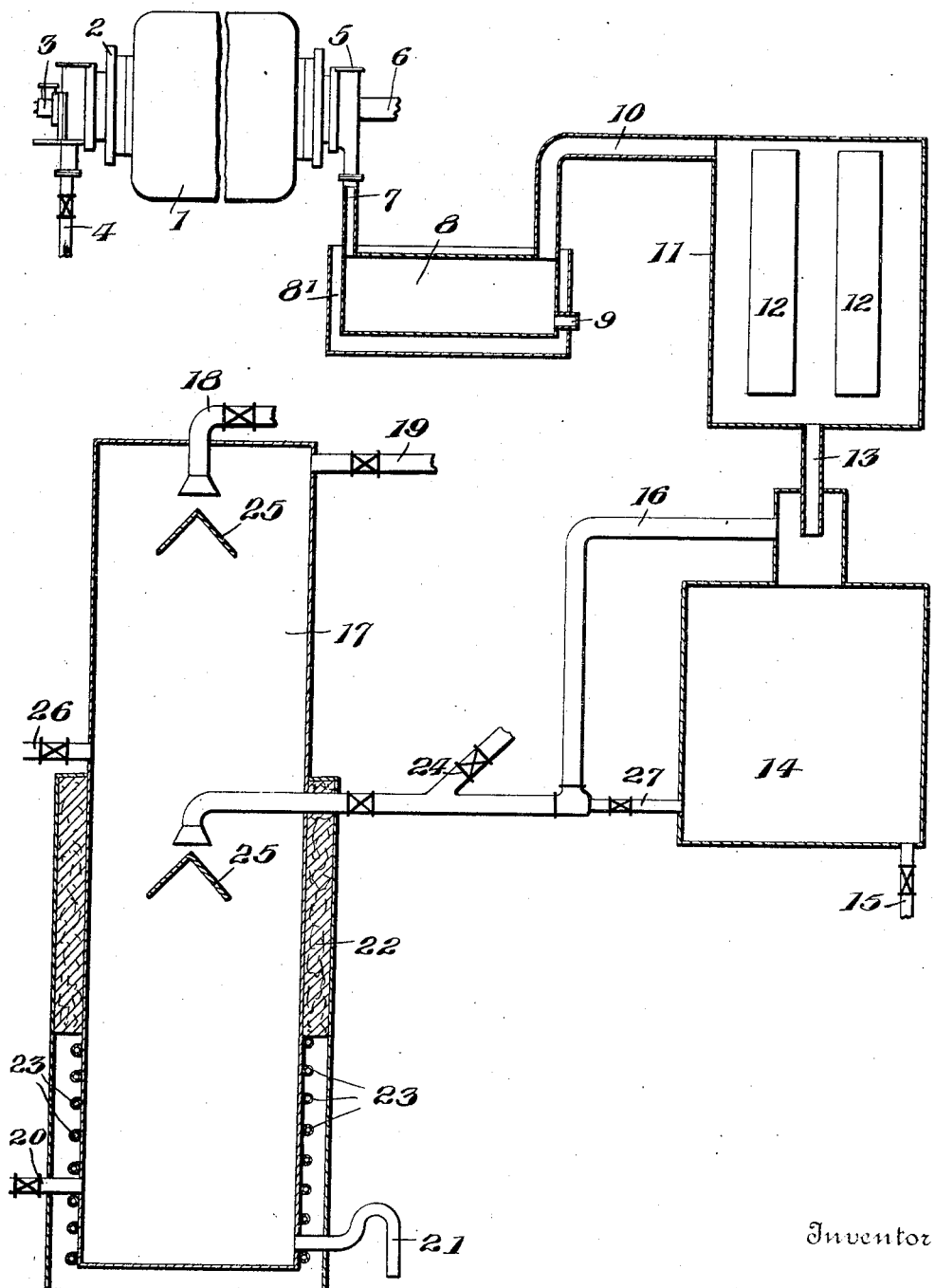
Inventor
Ernest W. Wescott
By W. P. McElroy
Attorney Patented Feb. 10, 1925.

1,525,480

UNITED STATES PATENT OFFICE.

ERNEST W. WESCOTT, OF NIAGARA FALLS, NEW YORK, ASSIGNOR, BY MESNE ASSIGNMENTS, TO METALLURGICAL DEVELOPMENT CORPORATION, OF BOSTON, MASSACHUSETTS, A CORPORATION OF MASSACHUSETTS.

MANUFACTURE OF ARSENIC ACID.

Application filed November 9, 1920. Serial No. 422,862.

*To all whom it may concern:*

Be it known that I, ERNEST W. WESCOTT, a citizen of the United States, residing at Niagara Falls, in the county of Niagara and State of New York, have invented certain new and useful Improvements in the Manufacture of Arsenic Acid, of which the following is a specification.

This invention relates to the manufacture of arsenic acid; and it comprises a method of forming arsenic acid wherein arsenious chlorid is treated with chlorin in the presence of limited amounts of water, thereby producing a concentrated solution of arsenic acid and vapors of HCl and more specifically, a method of forming arsenic acid from certain arsenid ores, wherein such ore is chlorinated, usually with some excess of chlorin and the effluent vapors, with or without condensation of some arsenious chlorid, are so treated with water and such further amount of chlorin as may be necessary; all as more fully hereinafter set forth and as claimed.

Arsenic acid and arsenates are desirable commercially for a number of uses; among them being the manufacture of insecticides. Customarily, the arsenic acid is produced by the oxidation of arsenious acid, or "white arsenic", by various methods of a more or less complicated and expensive nature. In the present invention I utilize another material, namely arsenious chlorid, thereby securing a simpler and cheaper operation and being enabled to make use of the by-products of certain metallurgical processes.

Arsenious chlorid is a heavy liquid, boiling at about 130° C. and miscible with small amounts of water without much apparent decomposition. I have found that I can directly oxidize it to arsenic acid by chlorin in the presence of water. The reaction evolves much heat and the product is, or may be, a hot strong sirupy solution of arsenic acid ($H_3AsO_4$) containing but little of the HCl also produced in the reaction; most of the HCl, under proper conditions of operation, going off as gas since it is but little soluble in such solutions of arsenic acid. With the use of chlorin reasonably free from inert gases, the HCl gas evolved is of concentrated character and is adapted to give with proper absorption means a strong HCl solution, or muriatic acid, of the standard 1.2 specific gravity. This acid may or may not contain arsenic; this depending on the circumstances of collection. Some arsenic is permissible in acid used in certain metallurgical operations. Where absence of arsenic is a desideratum the effluent vapors may be scrubbed with strong HCl solution in the presence of a little chlorin prior to condensation in towers or tourelles. The theoretical amount of water required by the chemical reactions to furnish solid $H_3AsO_4$ is about 4 parts by weight for each 10 parts by weight of arsenious chlorid; and I ordinarily employ between 8 and 16 parts in making a strong solution; the exact amount depending, of course, upon the strength of the arsenic acid solution which is desired, and upon the details of the apparatus used. With 10 parts by weight of arsenious chlorid and 4 parts of water, the amount of solid $H_3AsO_4$ which can be formed is about 7.8 parts. Using 8 parts of water, the result is about a 66 per cent acid, while with 16 parts of water, the result is an acid of about 39 per cent arsenic acid.

While arsenious chlorid from any source may be used in the described process, in practice I have found it desirable and advantageous, as well as economical to use that produced in certain processes of chlorinating various arsenid ores, notably the Canadian cobalt ores. These arsenid ores, which are difficult of beneficiation by ordinary metallurgical methods, on treatment with chlorin gas heat up and evolve vapors of arsenious chlorid, leaving a residue of fixed metallic chlorids from which the metallic values are readily recoverable by ordinary methods. Speisses may be treated in the same way. These vapors, which usually carry considerable free chlorin, from the use of an excess in chlorination of the ore, may be directly treated by the present process, thereby utilizing this excess of chlorin. It is merely necessary to add such further amount of chlorin to the vapors as may be required and contact the mixture with a limited amount of hot water or, better, with a hot solution of arsenic acid containing the required amount of water. Or the vapors from the chlorination may be cooled, thereby depositing much or most of the arsenious chlorid in the liquid state, and the residual mixture of free chlorin, uncondensed arsenious chlorid and inert gases, so treated. In these gases, after condensation of some or most of the arsenious chlorid, the ratio of chlorin to arsenious chlorid is of course higher than in the original gases coming from the chlorinator, and there is frequently no need for the addition of more chlorin. Where the waste gases contain large proportions of chlorin it is advantageous, in the present method, to so control the cooling for the condensation of arsenious chlorid as to leave an equivalent proportion of arsenious chlorid vapors uncondensed. The possibility of utilizing the waste gases coming from the arsenious chlorid condensers is one of the advantageous features of the present method as it obviates the necessity for scrubbing to get rid of uncondensed $AsCl_3$ vapors. Arsenious chlorid has a substantial vapor tension at low temperatures and where there is any substantial amount of other gases present, mere cooling will not condense it out with sufficient thoroughness to obviate the necessity of scrubbing the effluent gases or vapors. In scrubbing the excess of chlorin is lost.

The water necessary in the reaction may be contained in a strong solution of arsenic acid in water. On contacting such a solution with arsenious chlorid and chlorin, the arsenious chlorid goes over, practically quantitatively, into arsenic acid with the liberation of HCl. The arsenic acid joins that in the bath while the HCl, being very little soluble in hot concentrated solutions of arsenic acid, passes forward in the gaseous form and may be, as stated, collected and recovered. In the presence of free chlorin the oxidation of HCl by arsenic acid, that is, the converse reaction, does not take place. By a suitable adjustment of conditions, on feeding arsenious chlorid vapors and chlorin into a tower of the general type of a column still or scrubbing tower and supplied with a downflow of water, a hot strong solution of arsenic acid containing very little HCl, arsenious chlorid or free chlorin, can be withdrawn at the base of the tower while at the top a concentrated gaseous HCl passes forward for utilization elsewhere. Using arsenious chlorid vapors and chlorin free from inert gases, the HCl gas is undiluted except by water vapor and is readily condensed. As stated, prior to condensation, it may be given a muriatic acid scrub in the presence of a little chlorin (this being added if not already present) to get rid of traces of arsenic.

In another application, Serial No. 349,578, I have described and claimed a method of utilizing the values of various arsenid ores containing cobalt and the like, wherein the powdered or granulated ore travels in countercurrent through a hot zone against a current of chlorin gas. This chlorin may come from an electrolytic cell or may be gaseous chlorin produced from commercial liquid chlorin or may be chlorin from any source. With ores rich in arsenids, the liberation of heat in the chlorination reaction is generally enough to make it self-sustaining. The vapors withdrawn from contact with the ores are, or may be, nearly pure arsenious chlorid; containing however of course whatever excess of chlorin may have been used in the reaction. Ordinarily the apparatus is run under a little suction to prevent outward leakage, and in this case more or less air is apt to enter the system and dilute the vapors somewhat. Where temperatures in the chlorination are carried high enough to permit a volatilization of ferric chlorid, this may also come over in the vapors and may be condensed and separated for the most part by a limited degree of precooling. On then cooling the vapors to a low temperature, the $AsCl_3$ condenses to an extent depending partly on the temperature and partly on its concentration in the vapors. $AsCl^3$ has considerable vapor tension at even low temperatures and where the vapors are diluted with any amount of permanent gases (air, chlorin, etc.), substantial amounts may escape condensation for this reason. It is therefore necessary to pass residual uncondensed gases through a scrubbing tower. In the present invention this scrubbing operation may be used to produce arsenic acid. With these vapors goes forward most of the excess of chlorin originally used. The cooled mixture of uncondensed vapors and gases may be simply passed into a tower or column still through which water is flowing in a limited amount. If not enough chlorin is already present to correspond to the arsenious chlorid, some is added. The chlorin and arsenious chlorid entering the tower come into contact with a strong downflowing solution of arsenic acid, forming fresh arsenic acid which goes into solution, while gaseous HCl and water vapor pass upward and on for condensation elsewhere. In the presence of chlorine, with a limited amount of water in the system, there is substantially no decomposition of arsenious chlorid to form arsenic trioxid.

My invention of course may as well be applied to the whole amount of vapors of arsenious chlorid coming from the chlorinating apparatus as to the waste or tail gases coming from the arsenious chlorid condensers. In this event, the whole body of vapors and gases coming from the arsenid chlorinators, after condensation of ferric chlorid, may be led hot or but slightly cooled, into the column still being there joined by the required amount of additional chlorin.

Or the condensed arsenious chlorid may be revaporized, the vapors mixed with the requisite amount of chlorin and the mixture treated in the same manner. This is particularly advantageous in the manufacture of HCl for metallurgical muriatic acid, since it precludes the presence of diluting inert gases and therefore allows production of strong acid. Revaporizing is also desirable where a particularly pure arsenic acid is desired, as it allows a better separation of arsenious chlorid from iron chlorid than is readily obtainable by merely a precooling fractional condensation of the latter from the chlorinator gases. Revaporization may be used if the arsenid ore or materials used contains sulphur or other elements forming readily volatile chlorids. If desired, chlorin can be added to the material in the tower at a plurality of points.

The strong solution of arsenic acid withdrawn from the base of the tower can be used for the manufacture of arsenates, such as arsenate of soda, arsenate of lime, arsenate of lead, arsenate of copper, etc., in well understood ways.

As justed stated, the method is carried forward in a continuous way, vapors of arsenious chlorid, chlorin gas and water being continuously supplied to a reaction chamber of the general type of a column still, while arsenic acid in strong solution is withdrawn at the base. The process may however be carried out by what may be termed a batch method, a certain amount of arsenious chlorid and water contained in a suitable still or reaction chamber, provided with reflux condenser, exit means, and collecting means for HCl being treated by the introduction of chlorin thereinto. Part or all of the chorin may be in the form of waste gas from the chlorinator. The reaction developes a considerable amount of heat and the temperatures of the mixture steadily rise during the early part of the chlorination. Towards the end, external heat is or may be desirable. It is not generally desirable to allow the temperature of the bath to rise to the boiling point until the reaction is complete.

If the arsenic acid is to be used at the point of manufacture for the preparation of solid arsenates, any residual HCl remaining in the liquid is in general not disadvantageous as it can readily be neutralized prior to the precipitation of the arsenate.

If the solution of arsenic acid is prepared for shipment and sale as a standard commercial solution, the reaction chamber is fitted with a reflux condenser which is cooled during the oxidation. The solution is allowed to reach the boiling point, when HCl, water vapor and some arsenious chlorid pass up into the reflux condenser. Absorption of chlorin by the liquid at first is so complete that little or none of it may reach the condenser, and an auxiliary chlorin inlet at the base of the latter is provided, which is so operated that the effluent HCl finally passing to exit carries a small amount of chlorin.

The additional chlorin thus supplied reacts with the arsenious chlorid and water vapor in the condenser forming arsenic acid which returns as condensate to the still, and HCl which joins the effluent vapors. By this means the maximum amount of HCl is driven off during the reaction. The solution is next concentrated by externally applied heat, the water vapor carrying with it the residual HCl. Ordinary "cascade" evaporators may be used. Fused silica ware such as "Vitreosil", is well adapted for these processes.

In the accompanying illustration I have shown, more or less diagrammatically, in the manner of a flow sheet, an organization of apparatus elements capable of use in the operation of the described process. This showing is a diagrammatic view in central vertical section of a complete apparatus treating ore and producing arsenic acid.

Element 1 is a rotary cylinder of the general nature of a rotary kiln with a stationary housing at each end. The housing 2 at one end is provided with chlorin inlet 3 and valved or gated discharge 4 for the fixed chlorids, while at the other end the housing 5 carries an ore inlet conduit 6 and is provided with vapor conduit 7 leading down to a suitable tank 8 for the condensation of ferric chlorid, this tank being maintained at a temperature above the boiling point of arsenious chlorid by suitable heating or cooling means. As shown, it is located in a tank 8' containing oil or like temperature controlling fluid. Ferric chlorid condensing in this tank may be raked out at the flanged port 9. Conduit 10 leads to the condenser 11 provided with cooling means 12 and discharge conduit 13. Condensed liquid arsenious chlorid drops into storage tank 14, whence it may be removed through gated outlet 15. Uncondensed vapors and gases containing arsenious chlorid, chlorin, etc. pass forward through conduit 16 to a diagrammatically shown tower or column 17 supplied with a limited amount of water at 18 and having an outlet 19 for HCl, etc. Additional chlorin may be supplied at valved inlet 20 and strong arsenic acid solution removed by trapped conduit 21. The tower may be heated or cooled as the case may be by heating or cooling means. As shown, it is provided with a layer 22 of heat-insulating material and heating elements 23, which may be steam pipes or resistance coils. As the arsenious chlorid vapors and chlorin pass upward through the tower against downcoming water, this water becomes charged with arsenic acid and the HCl also formed passes upward and forward as vapor being removed (at 19) and sent to suitable place of condensation or use (not shown).

The amount of arsenious chlorid vapors going forward through 16 of course depends on the cooling exercised in 11, and if 11 be uncooled or kept hot, all the arsenious chlorid vapors may go forward through 16 to tower 17.

As shown, the upper portion of the tower is unjacketed and serves as a dephlegmating section to return arseniferous vapors. When it is so used, only part of the water required is introduced at 18, some being introduced directly with the AsCl$_3$ vapors by valved inlet 24. Steam may be used in lieu of water at this point. While I have merely shown ordinary distributor baffles 25 opposite the liquid inlets, it is to be understood that any of the usual liquid-distributing or subdividing devices may be employed; and the tower may contain any of the usual tower packings, such as broken quartz, coke, clay plates or rings, etc. Additional chlorin may be added in the dephlegmator section by valved inlet 26.

Liquid arsenious chlorid in greater or less proportions may be supplied to the AsCl$_3$ inlet (16) of the chloridizing tower by valved cross connection 27. Where the upper section is used as a dephlegmator with introduction of water at two points, I ordinarily add only about 5 to 15 per cent of the total amount at inlet 18. The water so introduced prevents more than mere traces of chlorin or arsenic passing forward with the HCl through 19. This outlet (19) may communicate with usual apparatus (not shown) for making hydrochloric or muriatic acid, that is with towers or tourelles.

What I claim is:—

1. In the manufacture of arsenic acid, the process which comprises reacting upon a limited amount of water with arsenious chlorid and free chlorin in such proportions as to produce a strong solution of arsenic acid with liberation and removal of HCl in the gaseous form.

2. In the manufacture of arsenic acid, the process which comprises reacting upon a limited amount of water with arsenious chlorid and free chlorin in such proportions as to produce a strong solution of arsenic acid and heating said solution to expel water and hydrochloric acid.

3. The process of producing arsenic acid from arsenid ores which comprises chlorinating such an ore to produce vapors of arsenious chlorid and reacting upon the arsenious chlorid with a limited amount of water and sufficient free chlorin to produce a strong solution of arsenic acid.

4. The process of producing arsenic acid from arsenid ores which comprises chlorinating such an ore to produce vapors of arsenious chlorid and reacting upon the arsenious chlorid with a limited amount of water and sufficient free chlorin to produce a strong solution of arsenic acid, and heating said solution to expel water and hydrochloric acid.

5. In the manufacture of arsenic acid the process which comprises passing vapors of arsenious chlorid and chlorin in counter current to a flow of water.

6. In the manufacture of arsenic acid the process which comprises passing vapors of arsenious chlorid and chlorin in counter current to a flow of water, temperature conditions and the relative amount of water being so adjusted that a hot strong solution of arsenic acid is formed.

7. In the manufacture of arsenic acid the process which comprises passing chlorine in counter current to a flow of water in the presence of arsenious chloride.

8. In the utilization of arsenid ores the process which comprises chlorinating such ores in a heated state with an excess of chlorin, cooling the effluent mixture of gases and vapors to condense part of the arsenious chlorid therefrom, and bringing the uncondensed gases and vapors into contact with a limited amount of water, additional chlorin being added in such amount as may be necessary in connection with the chlorin already present, to oxidize the residual arsenious chlorid to arsenic acid.

9. In the utilization of arsenid ores the process which comprises chlorinating such ores in a heated state with an excess of chlorin, cooling the effluent mixture of gases and vapors to condense part of the arsenious chlorid therefrom, and bringing the uncondensed gases and vapors into contact with a limited amount of water, additional arsenious chlorid being added in such amount as may be necessary in connection with the chlorin already present, to oxidize the residual arsenious chlorid to arsenic acid.

10. In the manufacture of arsenic acid the process which comprises passing chlorine in counter current to a flow of water in the presence of arsenious chloride, temperature conditions and the relative amount of water being so adjusted that a hot strong solution of arsenic acid is formed.

In testimony whereof, I affix my signature.

ERNEST W. WESCOTT.